April 22, 1969
R. L. REAMES
3,439,603
COOKING UTENSIL
Filed June 22, 1966
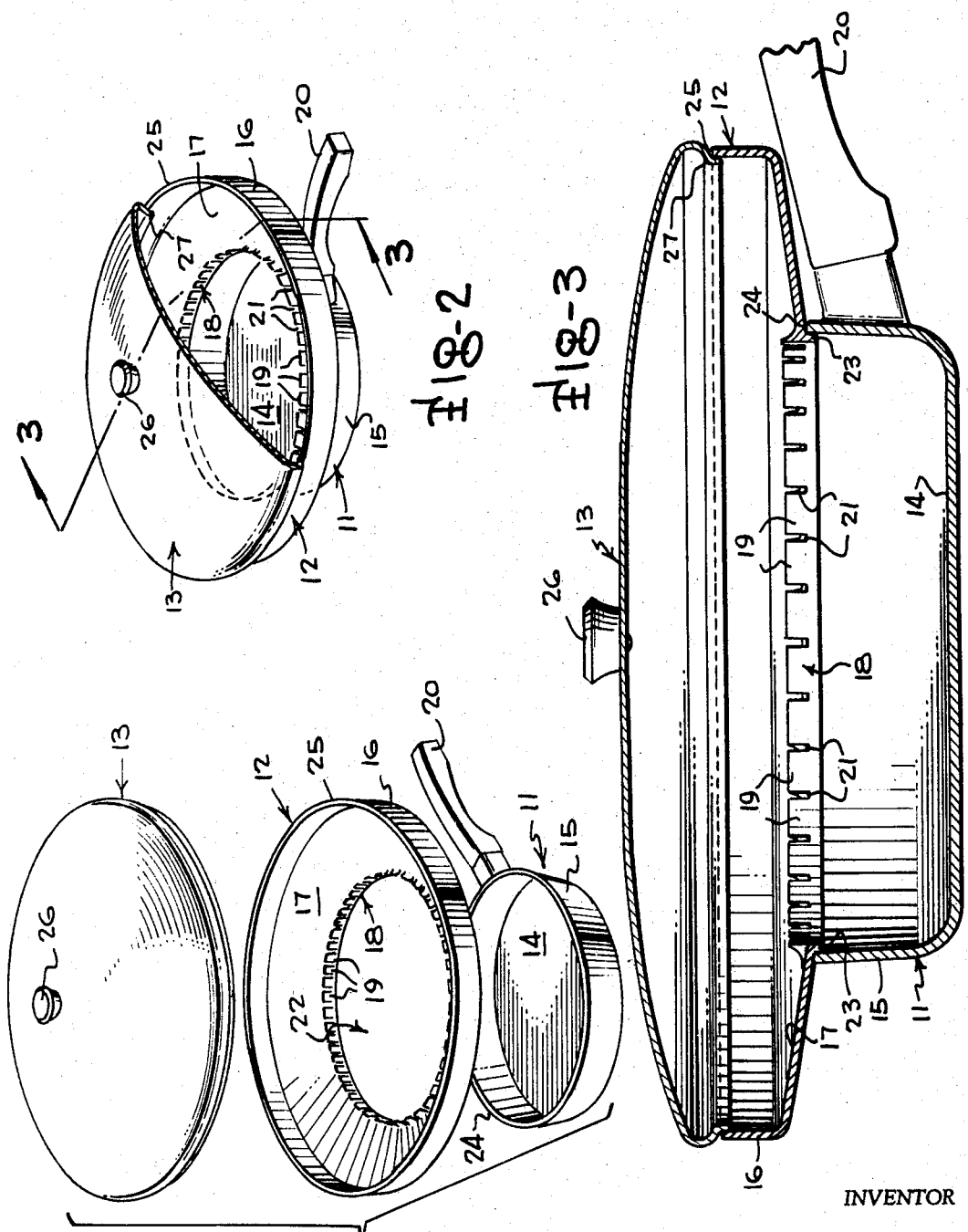
INVENTOR
ROBERT L. REAMES
BY Mason, Fenwick & Lawrence
ATTORNEYS United States Patent Office 3,439,603
Patented Apr. 22, 1969

3,439,603
COOKING UTENSIL
Robert L. Reames, 4619 Hanover Ave.,
Richmond, Va. 23226
Filed June 22, 1966, Ser. No. 559,440
Int. Cl. A47j 37/00
U.S. Cl. 99—355                                    14 Claims

ABSTRACT OF THE DISCLOSURE

A cooking pan having a supplemental peripherally extending food supporting rack including a coextensive upwardly extending slotted drain rim and downwardly extending locking lip engaging the inner pan periphery for retaining the rack in position on the pan.

It is a well recognized fact that a diet having a high fat content is not desirable and that persons having previous histories of arterial or cardiac disorders should be limited to very low fat content diets. Normally, fried foods have a high fat content because once the frying is completed there is no satisfactory way to remove the excess frying liquid from the fried foods. Thus, the fried foods retain a considerable quantity of the frying liquid, thereby causing these foods to be unsatisfactory for consumption by certain persons. By removing the excess frying liquid from fried foods while the liquid is still warm the fat content of the fried foods can be reduced considerably.

Therefore, it is a primary object of this invention to provide an improved utensil for cooknig foods, wherein the utensil has an integral storage means to maintain the foods out of contact with foods not in the storage means.

Another object of this invention is the provision of an improved utensil having an integral storage means wherein certain foods may be kept in a warmed condition while other foods are being cooked.

Another object of this invention is the provision of an improved utensil having a removable storage means which is light in weight and is designed to be utilized with a separable cooking pan.

Yet another object of this invention is the provision of an improved utensil having a separable internal food holding container which may be utilized upon a cooking pan to store food in a warmed condition while other food is still cooking, and yet allows full access to the food which is cooking by means of the central access opening in the storage means.

Other objects, advantages and capabilities of the invention will become apparent from the following description, taken in conjunction with the accompanying drawings showing only a preferred embodiment of the invention.

In the drawings:

FIGURE 1 is an exploded perspective view of the utensil of the present invenaion;

FIGURE 2 is a top perspective view of the utensil showing portions of the top broken away to show the internal structure when the utensil is in operative condition; and FIGURE 3 is a vertical section view taken along lines 3—3 of FIGURE 2.

Referring to the drawings wherein like reference characters designate corresponding parts throughout the several figures, the utensil of the present invention is generally compised of a lower pan 11 upon which rests an extender rack 12 and a pan cover 13 which completely enclosed the utensil during operation.

The lower pan 11 generally comprises a round pan having a bottom 14 and an annular upstanding side wall 15. Attached to the side wall 15 is a pan handle 20. In the present disclosure a specific lower pan is shown; however, it should be noted that in actual practice any pan might be used which properly mates with the extender rack 12.

Extender rack 12 comprises a rounded flattened member defined by an annular vertical wall 16 whose bottom periphery is attached to a supplemental food supporting storage shelf 17 which slopes inwardly and downwardly toward a slotted upstanding lip 18 at the inner periphery of the extender rack 12. The slotted lip 18 is defined by a plurality of upstanding finger portions 19 between which are slots 21 to allow drippings from the food stored upon the shelf 17 to return to the lower pan 11. The slotted lip 18 also defines an enlarged central opening 22 which allows access to the lower pan when the extender rack 12 is placed thereupon.

Extending in the same vertical plane as the slotted lip 18 but below the plane of the storage shelf is a lower locking lip 23 which is designed to engage the inner peripheral surface of the lower pan at the upper annular rim 24 thereof, so as to engage in locking condition the rack 12 to the pan 11.

Adapted to fit upon the upper annular rim 25 of the extender rack 12 is a pan cover 13 having a handle 26 to effect removal of the cover at desired times. The undersurface of the cover 13 has an inwardly and downwardly projecting lower lip 27 which engages the inner peripheral surface of the vertical wall 16 of the extender rack. The lower lip 27 also rests upon the annular rim 25 which provides the cover supporting surface.

In operation, particular foods which cook faster than others can be removed from the lower pan and placed upon the storage shelf 17 and kept warm while the remainder of the foods are being fried. In addition to being kept warm on shelf 17, the foods also release an excess frying liquid back into the lower pan. It it is desired to cook foods which require different cooking times, or to cook foods together in which it is desired that certain of the foods be kept segregated, it is convenient to utilize both the storage shelf 17 and the lower pan 11 at the same time.

Preferably, the utensil of the present invention may be made of stainless steel or aluminum for easy maintenance; however, this should not be taken in a limiting sense, since any suitable material may be used.

It is seen that the utensil of the present invention permits a person to fry foods, yet allows that excess frying liquid may be easily, completely and cleanly removed from the food once the frying process is complete. Also, it is obvious that, because of the overhanging construction of the extended rack, it acts as a splatter shield to keep popping grease from soiling the stove. Thus, from the foregoing, it is apparent that my device will accomplish the stated objectives and produce a substantial improvement over the prior art.

While I have particularly shown and described one particular embodiment of the invention, it is distinctly understood that the invention is not limited thereto, but that modifications may be made within the scope of the invention and such variations as are covered by the scope of the appended claims.

What is claimed is:

1. In a cooking utensil, the combination of a lower pan having a horizontally disposed bottom wall and a vertical sidewall member whose upper periphery defines an annular rim, a supplementl annular food supporting extender rack member removably disposed upon the annular rim of the lower pan, the supplemental food supporting extender rack member having a vertical upstanding sidewall terminating in a rack member upper rim, a storage shelf extending inwardly and downwardly from the upstanding sidewall to an inner peripheral surface defining an enlarged opening disposed centrally of said storage shelf permitting access to and inspection of the food in the bottom of the lower pan, the inner peripheral surface of the storage shelf having a vertically slotted upstanding rim to permit accrued liquids upon the shelf to drain back into the lower pan, said vertically slotted upstanding rim having an uppermost surface disposed in a plane below the plane in which the rack member upper rim lies, the slotted upstanding rim of the storage shelf having a plurality of slots extending below the upper surface of the storage shelf thereby permitting ready drainage of liquids from the shelf, said upstanding rim also projecting downwardly below the lower surface of the storage shelf to comprise a lower locking lip to engage the inner peripheral surface of the lower pan vertical sidewall.

2. In a cooking utensil, the combination recited in claim 1 wherein a removable cover means is provided to rest upon the supplemental food supporting extender rack member by engagement of the cover means with the vertical upstanding sidewall and rack member upper rim.

3. In a cooking utensil, the combination recited in claim 1 wherein the storage shelf of the extender rack member generally extends beyond the peripheral extent of the vertical sidewall of the lower pan.

4. In a cooking utensil, the combination recited in claim 1 wherein only the lower locking lip of the supplemental food supporting extender rack member lies below the plane of the annular rim of the lower pan vertical side wall.

5. In a cooking utensil, the combination of a lower pan having a horizontally disposed bottom wall and a vertical sidewall member whose upper periphery defines an annular rim, a supplemental annular food supporting extender rack member removably disposed upon the annular rim of the lower pan, the supplemental food supporting extender rack member having a vertical upstanding sidewall terminating in a rack member upper rim, a storage shelf extending inwardly and downwardly from the upstanding sidewall to an inner peripheral surface defining an enlarged opening disposed centrally of said storage shelf permitting access to and inspection of the food in the bottom of the lower pan, the inner peripheral surface of the storage shelf having a vertically slotted upstanding rim to permit accrued liquids upon the shelf to drain back into the lower pan, said upstanding rim also projecting downwardly below the lower surface of the storage shelf to comprise a lower locking lip to engage the inner peripheral surface of the lower pan vertical sidewall.

6. In a cooking utensil, the combination recited in claim 5 wherein a removable cover means is provided to rest upon the supplemental food supporting rack member by engagement of the cover means with the vertical upstanding sidewall and rack member upper rim.

7. In a cooking utensil, the combination recited in claim 5 wherein the storage shelf of the rack member generally extends beyond the peripheral extent of the vertical sidewall of the lower pan.

8. In a cooking utensil, the combination recited in claim 5 wherein only the lower locking lip of the supplemental food supporting rack member lies below the plane of the annular rim of the lower pan vertical sidewall.

9. In a cooking utensil, the combination of a lower pan having a horizontally disposed bottom wall and a vertical sidewall member whose upper periphery defines a rim having a given geometric configuration, a supplemental food supporting evtender rack member, removably disposed and extending completely around, the periphery of said rim of the lower pan, the supplemental food supporting extender rack member having a vertical upstanding side wall terminating in a rack member upper rim, a storage shelf extending inwardly and downwardly from the upstanding side wall to an inner peripheral surface defining an enlarged opening disposed centrally of said storage shelf and having the same geometrical configuration as said rim to permit access to and inspection of food in the bottom of the lower pan, the inner peripheral surface of the storage shelf having a vertically slotted upstanding rim to permit accrued liquid upon the shelf to drain back into the lower pan, said vertically slotted upstanding rim having an uppermost surface ending in a plane below the plane in which the rack member upper rim lies, the slotted upstanding rim of the storage shelf having a plurality of slots which extend below the lower level of the upper surface of the storage shelf thereby permitting ready drainage of liquids from the shelf, said upstanding rim also projecting downwardly below the lower surface of the storage shelf to comprise a lower locking lip to engage the inner peripheral surface of the lower pan vertical sidewall.

10. The invention recited in claim 9 wherein a removable covering means is provided to rest upon the supplemental food supporting extender rack member by engagement of the cover means with the vertical upstanding side wall and rack member upper rim.

11. In a cooking utensil, the combination of a lower pan having a horizontally disposed bottom wall and a vertical sidewall member whose upper periphery defines a rim, a supplemental food supporting rack member removably disposed upon the rim of the lower pan, the supplemental food supporitng rack member having vertical sidewall portions terminating in a rack member upper rim, a storage shelf extending inwardly and downwardly from the sidewall portions to an inner peripheral surface defining an enlarged central opening permitting access to and inspection of the food in the bottom of the lower pan, the inner peripheral surface of the storage shelf having an upstanding rim, said upstanding rim projecting downwardly below the lower surface of the storage shelf to comprise a lower locking lip to engage the inner peripheral surface of the lower pan vertical sidewall, said upstanding rim being continuous for extension about the entirety of said central opening, said rim being provided throughout its extent with spaced apart upwardly opening recesses.

12. In a cooking utensil, the combination recited in claim 11 wherein a removable cover means is provided to rest upon the supplemental food supporting rack member by engagement of the cover means with the vertical upstanding sidewall and rack member upper rim.

13. In a cooking utensil, the combination recited in claim 11 wherein the storage shelf of the rack member generally extends beyond the peripheral extent of the vertical sidewall of the lower pan.

14. In a cooking utensil, the combination recited in claim 11 wherein only the lower locking lip of the supplemental food supporting rack member lies below the plane of the annular rim of the lower pan vertical sidewall.

References Cited

UNITED STATES PATENTS

| 1,342,444 | 6/1920 | Howe | 99—355 |
| 2,940,379 | 6/1960 | Kenney et al. | 99—339 |
| 2,262,538 | 11/1941 | Olson et al. | 99—355 |
| 2,499,083 | 2/1950 | Ashworth et al. | 99—425 |
| 2,698,450 | 1/1955 | Mack | 134—92 XR |
| 3,087,417 | 4/1963 | Senn | 99—355 |
| 3,232,214 | 2/1966 | Aske | 99—340 |

FOREIGN PATENTS

| 363,708 | 12/1931 | Great Britain. |
| 853,336 | 10/1952 | Germany |

WALTER A. SCHEEL, *Primary Examiner.*

JOHN M. NEARY, *Assistant Examiner.*

U.S. Cl. X.R.

99—339, 413, 425